United States Patent [19]

Chang

[11] Patent Number: 4,496,706
[45] Date of Patent: Jan. 29, 1985

[54] ONE-COMPONENT POLYURETHANE ADHESIVE COMPOSITIONS

[76] Inventor: Eugene Y. C. Chang, 532 Rolling Hills Rd., Bridgewater, N.J. 08807

[21] Appl. No.: 483,983

[22] Filed: Apr. 11, 1983

[51] Int. Cl.³ .................... C08G 18/10; C08G 18/22; C08G 18/62; C08G 18/14
[52] U.S. Cl. ......................... 528/57; 528/76; 528/85; 528/81; 528/56; 528/54; 156/307.3; 156/331.4; 524/399; 524/394; 524/398
[58] Field of Search ..................... 528/76, 85, 81, 57, 528/56, 54; 156/307.3, 331.4; 524/399, 394, 398

[56] References Cited

U.S. PATENT DOCUMENTS

| | | | |
|---|---|---|---|
| 3,810,851 | 5/1974 | Norman et al. | 521/88 |
| 4,151,345 | 4/1979 | Hillegass | 528/56 |
| 4,390,678 | 6/1983 | LaBelle et al. | 156/331.4 |

*Primary Examiner*—John Kight
*Assistant Examiner*—Marvin L. Moore

[57] ABSTRACT

A heat-curable polyurethane composition, comprising:
(a) a secondary or tertiary aliphatic diisocyanate;
(b) a hydroxyl compound; and
(c) a curingly effective amount of a catalyst selected from the group consisting of magnesium acetylacetonate, nickel acetylacetonate, magnesium stearate, cadmium stearate, and organic acid salts of 1,8-diazabicyclo [5.4.0]undec-7-ene.

20 Claims, No Drawings

ONE-COMPONENT POLYURETHANE ADHESIVE COMPOSITIONS

BACKGROUND OF THE INVENTION

This invention generally relates to one-component i.e., single package, polyurethane adhesive compositions which are heat-curable. More particularly, it relates to catalyzed one-component polyurethane adhesive compositions which are heat-curable and storage stable.

DESCRIPTION OF THE PRIOR ART

Polyurethane adhesives are widely used for bonding various metallic, plastic and glass substrates because of their good bonding strength and versatility. Two-component polyurethane adhesive systems in which an isocyanate and a hydroxyl compound, e.g., a diisocyanate and polyol, are mixed shortly before use are particularly well-known in the art. However, in such an application the two components have to be properly measured and thoroughly mixed shortly before use because the isocyanate and hydroxyl compound components react to form a gel after standing at ambient temperatures for relatively short periods of time, on the order of several minutes to several hours.

Numerous types of compounds, such as tertiary amines, organotin compounds, and various metal complexes have been disclosed as effective curing catalysts for polyurethane adhesives. However, most catalysts catalyze the reaction of the hydroxyl compound with the isocyanate not only at elevated temperatures, but also at ambient (room) temperatures.

There is a need, therefore, for catalyzed one-component polyurethane adhesive systems that are stable at room temperature for extended periods of time, on the order of at least one month and provide good bonding strength on curing at elevated temperature by the application of heat.

DESCRIPTION OF THE INVENTION

The present invention relates to a one-component, heat-curable polyurethane composition suitable for use as an adhesive or bonding medium, comprising: (a) a secondary or tertiary aliphatic diisocyanate; (b) a hydroxyl compound; and (c) a curingly effective amount of a catalyst selected from the group consisting of magnesium acetylacetonate; nickel acetylacetonate, magnesium stearate, cadmium stearate, and organic acid salts of 1,8-diazabicyclo[5.4.0]undec-7-ene.

The invention also relates in another aspect to a process for bonding substrate workpieces with a polyurethane adhesive comprising applying a wet film of the above-described polyurethane composition interposed between and in contact with the substrate workpieces, and curing same at elevated temperature to form a solid polyurethane film adhesively bonding the substrate workpieces to one another.

In yet another aspect, the invention relates to an article comprising an assembly of substrate workpieces adhesively bonded to one another by a cured film of the above-described heat-curable polyurethane composition.

As used herein, "hydroxyl compound" means a diol, polyol or mixture of diols and/or polyols, which is capable of reaction with the secondary or tertiary aliphatic diisocyanate, at elevated temperatures and in the presence of the catalyst of the present invention, to form polyurethane as a reaction product.

The term "secondary or tertiary aliphatic diisocyanate" as used herein is intended to be broadly construed to encompass aliphatic diisocyanate compounds containing at least one secondary or tertiary isocyanate group, which are unreacted with any hydroxyl compound, as well as prepolymers having an isocyanate content of from about 5% to about 30% by weight, based on the weight of the prepolymer, formed as reaction products of hydroxyl-terminated polyesters or polyethers, and an aliphatic diisocyanate compound containing at least one secondary or tertiary isocyanate group.

The term secondary or tertiary isocyanate group means isocyanate bonded to a secondary or tertiary aliphatic or cycloaliphatic carbon atom.

As used herein, "heat-curable polyurethane composition" and "polyurethane composition" refer to diisocyanate/hydroxyl compound/catalyst compositions which are curable at elevated temperature to yield polyurethanes.

The polyurethane compositions of the present invention are stable for extended periods on the order of at least one month and thus suitably may be utilized in the form of a "one-component" system as a single package mixture of the diisocyanate/hydroxyl compound/catalyst constituents. Upon application, wet films of the instant polyurethane composition may be cured rapidly on heating to form cured polymeric films characterized by good bonding strength.

The one-component polyurethane composition of this invention offers the following advantages relative to the two-component systems of the prior art:

(1) it avoids the requirements of the prior art two-components systems of accurately measuring and mixing the diisocyanate and hydroxyl compound reactants, and catalyst, immediately prior to application and curing.

(2) The cure time of the catalyzed composition of the present invention at elevated temperature is substantially reduced, as compared to corresponding uncatalyzed compositions, thus saving time and energy (heat input) in the curing step.

(3) The composition of the present invention has excellent storage stability.

The one-component adhesive polyurethane composition of the present invention suitably may be prepared as a simple mixture of the catalyst, diisocyanate, and hydroxyl compound constituents.

Alternatively, the secondary or tertiary aliphatic diisocyanate of the polyurethane composition first may be prepared in the form of a prepolymer having an isocyanate content of from about 5% to about 15% by weight, based on the weight of the prepolymer, by reaction of a hydroxyl-terminated polyester or polyether with a stoichiometric excess of suitable diisocyanate compound. The hydroxyl-terminated polyester or polyether preferably is utilized in anhydrous form and preferably has an equivalent weight of from about 100 to about 2000, and most preferably from about 100 to about 1000. As used herein, "equivalent weight" is the member average molecular weight of the hydroxyl compound divided by the average number of hydroxyl groups per molecule therein. The prepolymer prepared as described above then may be mixed with the hydroxyl compound in stoichiometric proportion to the isocyanate content of the prepolymer and with the catalyst to form the one-component polyurethane composition.

Alternatively, the secondary or tertiary aliphatic diisocyanate and a stoichiometric amount of hydroxyl compound may be combined and partially reacted with one another at elevated temperature, to yield the prepolymer having an isocyanate content as described above, along with unreacted hydroxyl compound in stoichiometric proportion to such isocyanate content of the prepolymer. The partially reacted mixture then suitably is placed under a vacuum below 50° C., to degas the mixture in order to avoid foaming during curing. After degassing, the catalyst and optional fillers as hereinafter described may be added, degassed again if desired, and the resulting polyurethane composition stored in a closed container to avoid exposure to atmospheric moisture.

Optionally, inert fillers, such as silica, talc, clay, fumed silica (e.g., "Cab-o-sil" N-70TS), or the like, may be added to the polyurethane composition to achieve the necessary or desired thickness and thixotropic characteristics.

The catalyst employed in the polyurethane composition of the present invention is selected from the group consisting of magnesium stearate, cadmium stearate, magnesium acetylacetonate, nickel acetylacetonate, and organic acid salts of 1,8-diazabicyclo[5.4.0]undec-7-ene, such as the oleic acid and 2-ethylhexanoic acid salts. The preferred catalysts are magnesium stearate and the 2-ethylhexanoic acid salt of 1,8-diazabicyclo[5.4.0]undec-7-ene.

The catalysts employed in the polyurethane composition of this invention have particular utility when the polyurethane composition is used as a one-component adhesive system inasmuch as these catalysts have little or no catalytic effect at room temperature but have a strong catalytic effect at elevated temperature.

The concentration of the catalyst used in the polyurethane composition will depend on the particular type of diisocyanate, and hydroxyl compound constituents employed, the presence of additives, and the nature of the substrate(s) to be bonded. The concentration of magnesium or cadmium stearate employed generally is less than 1%, and preferably is from about 0.05% to about 0.2%, by weight, based on the weight of the polyurethane composition.

The concentration of magnesium or nickel acetylacetonate used in the polyurethane composition suitably may range from about 0.01% to about 4% by weight, and preferably from about 0.05% to about 2% by weight, based on the weight of the polyurethane composition.

The concentration of the oleic or 2-ethylhexanoic acid salt of 1,8-diazabicyclo[5.4.0]undec-7-ene which suitably may be employed in the polyurethane composition ranges from about 0.05% to about 2% by weight and preferably from about 0.1% to about 2% by weight, based on the weight of the polyurethane composition.

Some of the inert fillers, such as clay and fumed silica, may have a retarding effect on the cure rate. Therefore, in the presence of such fillers a higher concentration of the catalyst may be needed to maintain a fast cure rate.

Illustrative examples of suitable diisocyanates which may be used in the present invention include the following:
α, α, α', α'-tetramethyl-1,3-xylylene diisocyanate,
α, α, α', α'-tetramethyl-1,4-xylylene diisocyanate, methylenebis(4-cyclohexyl-isocyanate),
isophorone diisocyanate,
1,4-cyclohexylene diisocyanate,
1,8-p-menthane diisocyanate,
and the like.

The preferred diisocyanates are α, α, α', α'-tetramethyl-1,3-xylylene diisocyanate and methylenebis(4-cyclohexylisocyanate).

Illustrative samples of low molecular weight (non-polymeric) hydroxyl compounds suitable for use in the present invention include the following:
ethylene glycol,
glycerol,
1,3-butanediol,
1,4-butanediol,
1,2,6-hexanetriol,
diethylene glycol,
dipropylene glycol,
tripropylene glycol,
1,1,1-trimethylolpropane,
3-(2-hydroxyethoxy)-1,2-pro panediol,
1,1,1-tris[(2-hydroxyethoxy)-methyl]ethane,
and the like.

Preferably, the hydroxyl compound in use contains at least one secondary hydroxyl group, such as glycerol and hexanetriol. The term secondary hydroxyl group means a hydroxyl group bonded to a secondary carbon.

The polyol compound desirably has an equivalent weight of from about 100 to about 2000, preferably from about 100 to about 1000.

Polymeric hydroxyl-containing compounds, generally referred to in the art as "polyols, " may also be used advantageously in the polyurethane compositions of the present invention, wherein they function as coreactants with the isocyanate constituent to modify the rigidity of the final polymer. Suitable polyols include the following:
polypropylene glycol,
poly(ethylene adipate) (hydroxyl-terminated),
poly(butylene adipate) (hydroxyl-terminated),
polycaprolactone,
poly(tetramethylene ether glycol),
trifunctional polymers obtained by chain extending glycerol or trimethylolpropane with propylene oxide, and/or caprolactone units,
polyesters made from dibasic acids, diols and triols to provide polymers having more than two hydroxyl groups per molecule,
polyacrylates containing hydroxyethyl acrylate, hydroxypropyl acrylate, hydroxyethyl methacrylate, or hydroxypropyl methacrylate units, which thus have numerous pendant hydroxyl groups per polymer molecule, and the like.

In end-use adhesive applications, the time required to cure the polyurethane composition of the invention will depend on the temperature and shape of the substrate materials used, as well as the heat transfer media employed for imposing elevated temperature curing conditions on the adhesive film.

In the preferred practice of the invention, wherein the polyurethane composition employs as the hydroxyl compound a polyol containing secondary hydroxyl groups, the applied polyurethane composition suitably is cured by heating at 100°–180° C. for about 10 –60 minutes.

In an especially preferred practice of the invention, wherein the polyurethane composition employs as the hydroxyl compound constituent a polyester or polyether oligomeric polyol, together with glycerol, the applied polyurethane composition is cured by heating at 120°–150° C. for about 5–20 minutes.

The invention is more fully illustrated by the following examples, which include particular features of the invention. However, the examples are not to be construed as limiting the invention in any way, it being understood that numerous variations are possible without departing from the spirit, or scope, of the invention. All parts and percentages in the examples are by weight, unless otherwise noted.

EXAMPLE 1

An isocyanate-terminated prepolymer was prepared by reacting a mixture of a difunctional polycaprolactone (52.0 grams of NIAX PCP-200; equivalent weight=260) and a trifunctional polycaprolactone (20.0 grams of NIAX PCP-301; equivalent weight=100), previously dehydrated under vacuum, with α, α, α', α'-tetramethyl-1,3-xylylene diisocyanate (100.0 grams) by heating at 100° C. for 7 hours, then at 90° C. for 26 hours. The resulting product had an isocyanate content of 10.2%, calculated as NCO.

(A) A paste was prepared by mixing 7.31 grams of the above prepolymer and glycerol (0.54 gram). The resulting mixture was storage-stable at room temperature for 8 weeks, and had a set-up (curing) time at 150° C. of more than 40 minutes.

(B) A paste was prepared by mixing the above prepolymer (8.39 grams), glycerol (0.62 gram), and magnesium stearate (0.009 gram). The resulting mixture was storage-stable at room temperature for 8 weeks, and had a set-up time at 150° C. of 3 minutes.

EXAMPLES 2–4

Mixtures were made to provide concentrations of magnesium stearate of 0.1%, 0.4%, and 0.6% in the adhesive compositions of Examples 2, 3, and 4, respectively.

| Example | 2 | 3 | 4 |
|---|---|---|---|
| Prepolymer of Example 1, grams | 8.39 | 7.07 | 8.87 |
| Glycerol, gram | 0.62 | 0.525 | 0.66 |
| Magnesium stearate, gram | 0.009 | 0.304 | 0.57 |

The adhesive was applied to one end of each of two pieces of cold rolled steel (1 inch wide, 5 inches long, and 0.06 inch thick) to obtain a glueline thickness of 0.060 inch. The treated ends of the two pieces of steel were overlapped 1 inch, clamped together with two clamps, and cured in an oven at 150° C. for 20 minutes. The steel was then cooled at ambient temperature for one day, the clamps were removed, and the lapshear tensile strength was measured with an Instron tensile testing machine. The results obtained were 2300 psi, 670 psi, and 550 psi for the adhesives of Examples 2, 3, and 4, respectively. These results illustrate that there is an adverse effect of the magnesium stearate catalyst on the bond strength at high concentration levels due to its lubricating character. Therefore, care should be exercised in selecting its concentration for particular substrates.

EXAMPLE 5

An isocyanate-terminated prepolymer was prepared by reacting a mixture of NIAX PCO-200 (52.0 grams) and NIAX PCO-301 (20.0 grams), previously dehydrated under vacuum, with methylenebis(4-cyclohexylisocyanate) (86.3 grams; 0.33 mole) at 90° C. for 3.5 hours. The resulting product had an isocyanate content of 10.8%.

(A) A paste was prepared by mixing 5.0 grams of the above prepolymer, 1,2,6-hexanetriol (0.58 gram; equivalent weight=45), and zinc stearate (0.005 gram). The resulting mixture was storage-stable at room temperature for two weeks, and had a set-up time at 150° C. of 2 minutes.

(B) A paste was prepared by mixing 9.7 grams of the above prepolymer, glycerol (0.77 gram; equivalent weight=31), and zinc stearate (0.01 gram). The resulting mixture was storage stable at room temperature for three weeks, and had a set-up at 150° C. of 2 minutes.

(C) A paste was prepared by mixing 5.0 grams of the above prepolymer, and glycerol (0.38 gram). The resulting mixture had a set-up time at 150° C. of greater than one hour.

Examination of the storage stabilities of the compositions of Example 5 (A) and (B) shows that compositions containing zinc stearate have insufficient storage-stability to be of practical long-term utility.

EXAMPLE 6

A prepolymer was prepared in the manner of Example 1 except that a mixture of 250 grams of NIAX PCP-200, 100 grams of NIAX PCP-301, and 500 grams of α, α, α', α', -tetramethyl-1,3-xylylene diisocyanate was heated at 90° C. for 24 hours. The resulting product had an isocyanate content of 10.8%.

A paste was prepared by mixing the above prepolymer (9.34 grams), glycerol (0.75 gram), and nickel acetylacetonate (0.0588 gram). The resulting mixture was storage-stable at room temperature for 4 weeks, and had a set-up time at 150° C. of 3 minutes.

EXAMPLE 7

The procedure of Example 1 was followed to prepare an isocyanate-terminated prepolymer except that the reaction mixture was heated at 100° C. for 15 hours. The resulting prepolymer had an isocyanate content of 10.5%.

(A) A paste was prepared by mixing the above prepolymer (12.98 grams), glycerol (1.00 grams), and magnesium acetylacetonate (0.069 gram). The resulting mixture was storage-stable at room temperature for 4 weeks, and had a set-up time at 150° C. of 2 minutes.

(B) A paste was prepared by mixing the above prepolymer (8.89 grams), glycerol (0.69 gram), and zinc acetylacetonate (0.048 gram). The resulting mixture was storage-stable at room temperature for one day, and had a set-up time at 150° C. of 0.5 minute.

(C) A paste was prepared by mixing the above prepolymer (10.06 grams), glycerol (0.78 gram), and cadmium acetylacetonate (0.054 gram). The resulting mixture was storage-stable at room temperature for 2 days, and had a set-up time at 150° C. of 2 minutes.

Comparison of the results obtained in Examples 7 (A), (B), and (C) shows that the composition containing magnesium acetylacetonate has superior storage-stability over those containing zinc and cadmium acetylacetonates.

EXAMPLE 8

A prepolymer was prepared in the manner of Example 1 except that a mixture of 260 grams of NIAX PCP-200, 100 grams of NIAX PCP-301, and 500 grams of α, α, α', α'-tetramethyl-1,4-xylylene diisocyanate was heated to 110° C., filtered to remove some insoluble material, and heated at 90° C. for 6.5 hours. The resulting product had an isocyanate content of 9.4%.

A paste was prepared by mixing the above prepolymer (10.89 grams), 1,4-bis(2-hydroxyethoxy)benzene(2.4 grams), and magnesium acetylacetonate (0.0665 gram). The resulting mixture had a set-up time at 150° C. of 4 minutes. Application of the mixture to cold rolled steel and curing, as described in Examples 2-4, gave a lap-shear tensile strength of 1830 psi.

What is claimed is:

1. A heat-curable one-component polyurethane adhesive composition, storage stable at room temperature for at least four weeks comprising: (a) a secondary or tertiary aliphatic diisocyanate; (b) a hydroxyl compound; and (c) a curingly effective amount of a catalyst selected from the group consisting of magnesium acetylacetonate, nickel acetylacetonate, magnesium stearate, cadmium stearate, and organic acid salts of 1,8-diazabicyclo[5.4.0]undec-7-ene.

2. A polyurethane composition according to claim 1 wherein the catalyst is magnesium stearate or cadmium stearate, at a concentration of from about 0.05% to about 1% by weight based on the weight of the composition.

3. A polyurethane adhesive composition according to claim 1 wherein the catalyst is magnesium acetylacetonate or nickel acetylacetonate, at a concentration of from about 0.01% to about 4% by weight, based on the weight of the composition.

4. A polyurethane composition according to claim 1 wherein the catalyst is an oleic acid salt or a 2-ethylhexanoic acid salt of 1,8-diazabicyclo[5.4.0]undec-7-ene.

5. A polyurethane composition according to claim 4, wherein said catalyst is present at a concentration of from about 0.05% to about 2% by weight, based on the weight of the composition.

6. A polyurethane composition according to claim 1 wherein said secondary or tertiary aliphatic diisocyanate is a prepolymer having an isocyanate content of from about 5% to about 30% by weight based on the weight of the prepolymer, and formed as a reaction product of a hydroxyl-terminated polyester or polyether and a diisocyanate compound.

7. A polyurethane composition according to claim 1 wherein said polyester or polyether has an equivalent weight of from about 100 to about 2000.

8. A composition according to claim 1 wherein said secondary or tertiary aliphatic diisocyanate (a) is selected from the group consisting of:
α, α, α', α'-tetramethyl-1,3-xylylene diisocyanate;
α, α, α', α'-tetramethyl-1,4-xylylene diisocyanate;
methylenebis(4-cyclohexylisocyanate);
1,4-cyclohexylene diisocyante; and
1,8-p-menthane diisocyanate.

9. A composition according to claim 1 wherein said hydroxyl compound (b) is selected from the group consisting of:
ethylene glycol;
glycerol;
1,3-butanediol;
1,4-butanediol;
1,2,6-hexanetriol;
diethylene glycol;
dipropylene glycol;
tripropylene glycol;
1,1,1-trimethylolpropane;
3-(2-hydroxyethoxy)-1,2-propanediol;
1,1,1-tris[(2-hydroxyethoxy)methyl]ethane;
polypropylene glycol;
hydroxyl-terminated poly(ethylene adipate);
hydroxyl-terminated poly(butylene adipate):
polycaprolactone;
poly(tetramethylene ether glycol);
trifunctional polymers obtained by chain extending glycerol or trimethylolpropane with propylene oxide, and/or caprolactone units;
polyesters made from dibasic acids, diols and triols to provide polymers having more than two hydroxyl groups per molecule; and
polyacrylates containing hydroxyethyl acrylate, hydroxypropyl acrylate, hydroxyethyl methacrylate, or hydroxypropyl methacrylate repeating units.

10. A composition according to claim 1 wherein said hydroxyl compound (b) contains at least one secondary hydroxyl group per molecule.

11. A process for bonding substrate workpieces with a polyurethane adhesive, comprising applying a wet film of said polyurethane composition of claim 1 interposed between and in contact with said substrate workpieces, and curing same at elevated temperature to form a solid polyurethane film adhesively bonding said substrate workpieces to one another.

12. A process according to claim 11 wherein the catalyst in said polyurethane composition is magnesium stearate or cadmium stearate, at a concentration of from about 0.05% to about 1% by weight based on the weight of the composition.

13. A process according to claim 11 wherein the catalyst in said polyurethane composition is magnesium acetylacetonate or nickel acetylacetonate, at a concentration of from about 0.01% to about 4% by weight, based on the weight of the composition.

14. A process according to claim 11 wherein the catalyst in said polyurethane composition is an oleic acid salt or a 2-ethylhexanoic acid salt of 1,8-diazabicyclo[5.4.0]undec-7-ene.

15. A process according to claim 11 wherein said secondary or tertiary aliphatic diisocyanate in said polyurethane composition is a prepolymer having a isocyanate content of from about 5% to about 30% by weight, based on the weight of the prepolymer, and formed as a reaction product of a hydroxyl-terminated polyester or polyether and a diisocyanate compound.

16. A process according to claim 15 wherein said polyester or polyether has an equivalent weight of from about 100 to about 2000.

17. A process according to claim 11 wherein said secondary or tertiary aliphatic diisocyanate in said polyurethane composition is selected from the group consisting of:
α, α, α', α'-tetramethyl-1,3-xylylene diisocyanate;
α, α, α', α'-tetramethyl-1,4-xylylene diisocyanate;
methylenebis(4-cyclohexyl-isocyanate);
1,4-cyclohexylene diisocyanate; and
1,8-p-menthane diisocyanate.

18. A process according to claim 11 wherein said hydroxyl compound in said polyurethane composition is selected from the group consisting of:
ethylene glycol;
glycerol;
1,3-butanediol;
1,4-butanediol;
1,2,6-hexanetriol;
diethylene glycol;
dipropylene glycol;

tripropylene glycol;
1,1,1-trimethylolpropane;
3-(2-hydroxyethoxy)-1,2-propanediol;
1,1,1-tris[(2-hydroxyethoxy)methyl]ethane;
polypropylene glycol;
hydroxyl-terminated poly(ethylene adipate);
hydroxyl-terminated poly(butylene adipate);
polycaprolactone;
poly(tetramethylene ether glycol);
trifunctional polymers obtained by chain extending glycerol or trimethylolpropane with propylene oxide, and/or caprolactone units;

polyesters made from dibasic acids, diols and triols to provide polymers having more than two hydroxyl groups per molecule; and polyacrylates containing hydroxyethyl acrylate or hydroxyethyl methacrylate repeating units.

19. A process according to claim 11 wherein said hydroxyl compound in said polyurethane composition contains at least one secondary hydroxyl group per molecule.

20. An article comprising an assembly of substrate workpieces adhesively bonded to one another by a cured film of the heat-curable polyurethane composition of claim 1.

* * * * *